United States Patent
Stadtherr

(10) Patent No.: US 8,104,825 B2
(45) Date of Patent: Jan. 31, 2012

(54) VEHICLE BUMPER ASSEMBLY

(75) Inventor: Jason Edward Stadtherr, Novi, MI (US)

(73) Assignee: Toyota Motor Engineering & Manufacturing North America, Inc., Ann Arbor, MI (US)

( * ) Notice: Subject to any disclaimer, the term of this patent is extended or adjusted under 35 U.S.C. 154(b) by 367 days.

(21) Appl. No.: 12/247,229

(22) Filed: Oct. 8, 2008

(65) Prior Publication Data

US 2010/0084879 A1     Apr. 8, 2010

(51) Int. Cl.
*B60R 19/02* (2006.01)

(52) U.S. Cl. .......................... 296/155; 49/28; 296/146.8

(58) Field of Classification Search ................ 296/1.04, 296/1.07, 1.08, 146.8; 49/383, 460, 462, 49/26, 27, 28; 24/292–295, 297, 457, 458; 293/135, 136, 137, 117, 142, 155; *B60R 19/04; B60J 5/00, 5/10*
See application file for complete search history.

(56) References Cited

U.S. PATENT DOCUMENTS

| | | | |
|---|---|---|---|
| 6,227,501 B1 | 5/2001 | Malcolm | |
| 7,000,352 B2 * | 2/2006 | Ishihara et al. | 49/28 |
| 7,156,454 B1 | 1/2007 | Dogan | |

FOREIGN PATENT DOCUMENTS

| | | | |
|---|---|---|---|
| JP | 2000168472 A | * | 6/2000 |
| JP | 2002195225 A | * | 7/2002 |
| JP | 2006219006 A | * | 8/2006 |
| WO | WO 02/14091 A2 | | 2/2002 |

OTHER PUBLICATIONS

English translation of previously cited foreign patents.*

* cited by examiner

*Primary Examiner* — Glenn Dayoan
*Assistant Examiner* — Pinel Romain
(74) *Attorney, Agent, or Firm* — Garrana Tran LLP; Andrea E. Tran

(57) ABSTRACT

A vehicle bumper assembly includes a bracket for mounting to an interior of a vehicle, the bracket defining a protrusion portion to engage with one end of a bumper cover and an elastic clip coupled to the bracket, wherein the elastic clip is adapted to contact the bumper cover of the vehicle. A finger protection assembly for a vehicle is provided wherein the assembly includes a bracket for mounting to an interior of a vehicle, the bracket defining a protrusion portion to engage with one end of a bumper cover and an elastic clip coupled to the bracket, the clip adapted to contact the bumper cover of the vehicle, wherein the elastic clip is capable of deforming to prevent injury to the finger inserted between a rear door and the bumper cover.

19 Claims, 4 Drawing Sheets

VEHICLE BUMPER ASSEMBLY

BACKGROUND

1. Technical Field

The present disclosure relates generally to a vehicle bumper and, more specifically, to a vehicle bumper assembly for preventing bodily injury from the closing of a vehicle door.

2. Background Information

The front and rear ends of a motor vehicle typically comprise a bumper and bumper cover which form the outer appearance of the vehicle. A bumper may serve the purpose of absorbing impact experienced at either end of the vehicle during a collision. In a vehicle, such as a hatchback or sport utility vehicle (SUV), the downward movement of the rear door toward a closing position may result in an obstruction by an object or body part against the bumper cover and/or the rear door. In some situations, an individual's body part, such as a hand or finger, can be injured or pinched against the rear door upon its closure. Thus, a need exists for a bumper assembly to prevent bodily injury upon the closing of a rear door of a vehicle.

SUMMARY

The following presents a general summary of several aspects of the disclosure in order to provide a basic understanding of the disclosure. This summary is not an extensive overview of the disclosure nor is it intended to identify key or critical elements or to delineate the scope of the claims. The following summary merely presents some concepts of the disclosure in a general form as a prelude to the more detailed description that follows.

One aspect of the present disclosure is a vehicle bumper assembly provided with a bracket for mounting to an interior of a vehicle wherein the bracket defines a protrusion portion to engage with one end of a bumper cover. The vehicle bumper assembly also includes an elastic clip coupled to the bracket wherein the elastic clip is adapted to contact the bumper cover of the vehicle.

Another aspect of the present disclosure is a vehicle which is provided with an interior disposed within a body, the body forming a bumper and a bumper cover in contact with the bumper. The vehicle also includes a bracket coupled to the interior, the bracket defining a protrusion portion to engage with one end of the bumper cover and an elastic clip coupled to the bracket, wherein the clip is adapted to contact the bumper cover.

Yet another aspect of the present disclosure is a finger protection assembly for a vehicle provided with a bracket for mounting to an interior of a vehicle, wherein the bracket defines a protrusion portion to engage with one end of a bumper cove. The finger protection assembly for a vehicle also includes an elastic clip coupled to the bracket the clip adapted to contact the bumper cover of the vehicle and wherein the elastic clip is capable of deforming to prevent injury to the finger inserted between a rear door and the bumper cover.

BRIEF DESCRIPTION OF THE DRAWINGS

For simplicity and clarity of illustration, the drawing and/or figures illustrate the general manner of construction of a motor vehicle and components thereof. Descriptions and details of well known features and techniques may be omitted to avoid unnecessarily obscuring the disclosure.

For detailed understanding of the present disclosure, references should be made to the following detailed description of the several aspects, taken in conjunction with the accompanying drawings, in which like elements have been given like numerals and wherein.

DETAILED DESCRIPTION

Before the present apparatus and assembly are described, it is to be understood that this disclosure is not limited to the particular apparatus and assembly described, as such may vary. One of ordinary skill in the art should understand that the terminology used herein is for the purpose of describing possible aspects, embodiments and/or implementations only, and is not intended to limit the scope of the present disclosure which will be limited only by the appended claims. For example, to one of ordinary skill in the art, it will be readily apparent that the vehicle bumper assembly as discussed herein may be implemented in a variety of ways, and that the forgoing discussion of certain of these implementations does not necessarily represent a complete description of all possible implementations.

It must also be noted that as used herein and in the appended claims, the singular forms "a," "and," and "the" may include plural referents unless the context clearly dictates otherwise. Thus, for example, reference to "a bumper" may refer to one or multiple bumpers, and reference to "a method of preventing" includes reference to equivalent steps and methods known to those skilled in the art, and so forth.

The present disclosure provides an improved vehicle bumper assembly which may reduce or eliminate the occurrence of bodily injury or the pinching of body parts against a vehicle door. The assembly disclosed herein is intended to protect an individual from experiencing bodily injury or the pinching of bodily parts upon the closing of a rear or trunk door of a vehicle.

Figure 1:
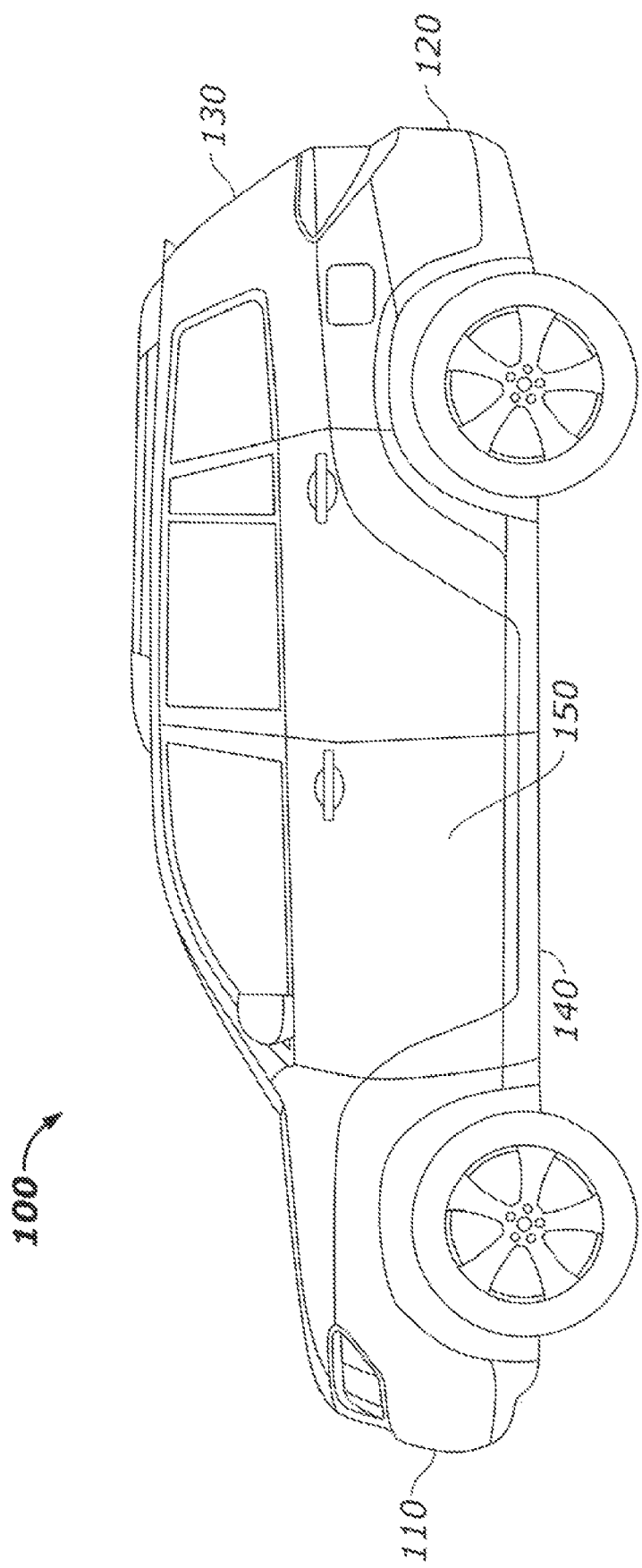
FIG. 1 represents an illustrative schematic of a motor vehicle according to one aspect of the present disclosure.

Beginning with FIG. 1, an illustrative schematic of a motor vehicle is provided according to one aspect of the present disclosure. The vehicle, indicated generally at 100, may have a body 140 serving as a structural frame which includes a driver/passenger door 150, a rear door 130, a front bumper 110 and rear bumper 120. The rear door 130, such as a trunk door, may be in a position (i.e., closed) so as to be in contact with the rear bumper 120. For purposes of illustration only, the discussion below may pertain to the rear bumper 120 and rear door 130 of a sport utility vehicle (SUV) in which a downward movement of the rear door 130 to a closing position may result in obstruction by an object or body part (e.g., finger, hand) of an individual. A vehicle 100 may include various components, some of which are described herein, and additional components not described. Thus, a vehicle 100 is not meant to be limited to the embodiment or components shown or discussed in the present disclosure.

Figure 2:
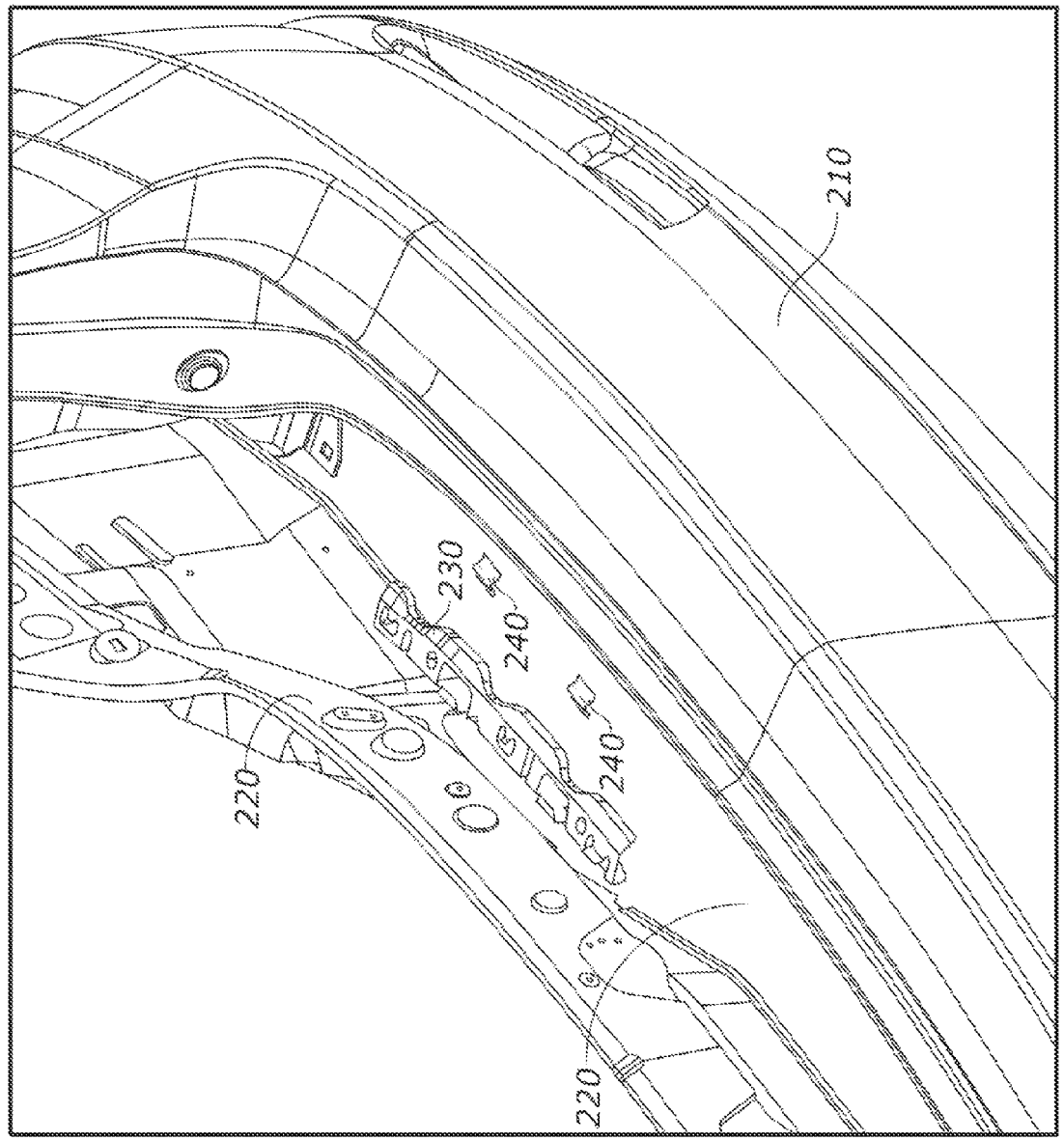
FIG. 2 represents an exploded perspective view of a vehicle bumper assembly according to another aspect of the present disclosure.

A vehicle bumper assembly according to certain aspects of the present disclosure will be described in detail below with reference to FIGS. 2-4. Referring now to FIG. 2, an exploded perspective view of a vehicle bumper assembly is shown. The bumper assembly includes a bracket 230 coupled to at least one elastic clip 240. The bracket 230 may be adapted to be fixedly secured to an interior 220 of a vehicle body. Further, a portion of the bracket 230 may be engaged with one end of a bumper cover 210, to be described below.

Typically, a bumper cover 210 may provide a structural form to the vehicle while absorbing impact experienced at either end of the vehicle during a collision. The bumper cover 210 may be made from a thermoplastic material including, but not limited to polypropylene and polyethylene, and having a generally convex curved shape. The bumper cover 210 may be arranged at any particular site on a front or rear of a vehicle body so as to extend in the vehicle width direction. Any conventional means of mounting or fixedly securing the bumper cover 210 to a vehicle bumper may be utilized.

Figure 3:
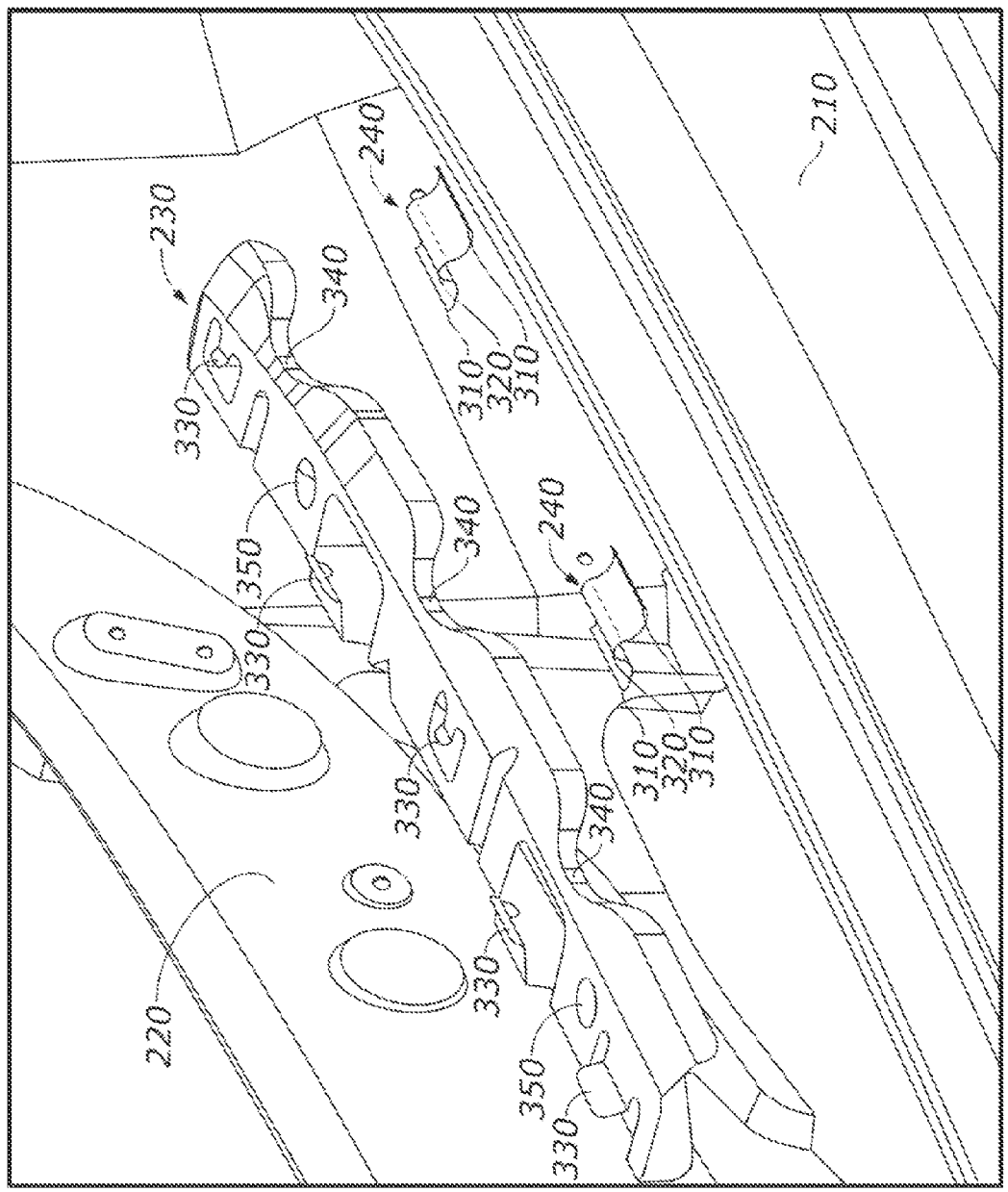
FIG. 3 represents an enlarged view of the vehicle bumper assembly in FIG. 2.

Turning to FIG. 3, an enlarged view is provided of a vehicle bumper assembly comprising the bracket 230 and an elastic clip 240 (e.g., spring clip). The bracket 230 may include a protrusion portion 330 adapted to fixedly secure the bracket 230 to the bumper cover 210 of the vehicle. To conform to the internal surface shape of the interior 220 of the vehicle body to which it is to be fitted, the bracket 230 may have a single or multiple concave curved portions 340 and/or apertures 350, as shown, or in any suitable shape corresponding to the surface of the interior 220. The bracket 210 and protrusion portion 330, having high rigidity, may be formed from any flexibly rigid material such as metal or the like. The present disclosure contemplates any suitable number of elastic clips 240 or protrusion portions 330 on the bracket 230 although two elastic clips 240 and five protrusion portions 330 are shown.

Protrusion portions 330 may be integrally provided at a plurality of points along the longitudinal edge of the bracket 230, separated by intervals, along the surface which may engage with the inner surface of a bumper cover 210. The protrusion portions 330 may protrude in an upward or vehicle up direction. Ends of the protrusion portions 330 are capable of bending to any suitable height above the surface of the bracket 230 to be engaged with an end of the bumper cover 210. As shown in FIGS. 2-4, the end of the protrusion portion 330 may be shaped as a clip or generally having a u-shape cross section. However, it is understood that the protrusion portion 330 may take the form of any shape or may use any conventional fastening structure to allow engagement with an edge of the bumper cover 210.

Continuing with FIG. 3, at least one elastic clip 240, made of a resilient material such as metal, plastic or the like, may be coupled to the bracket 230 at a clip bracket interface 310. Coupling between the elastic clip 240 and the bracket 310 may occur through any conventional means such as by the use of adhesives, fasteners, bolts or the like. Also, each of the elastic clips 240 may be in contact with the underside of a bumper cover 210 at a clip bumper interface 320.

Figure 4:
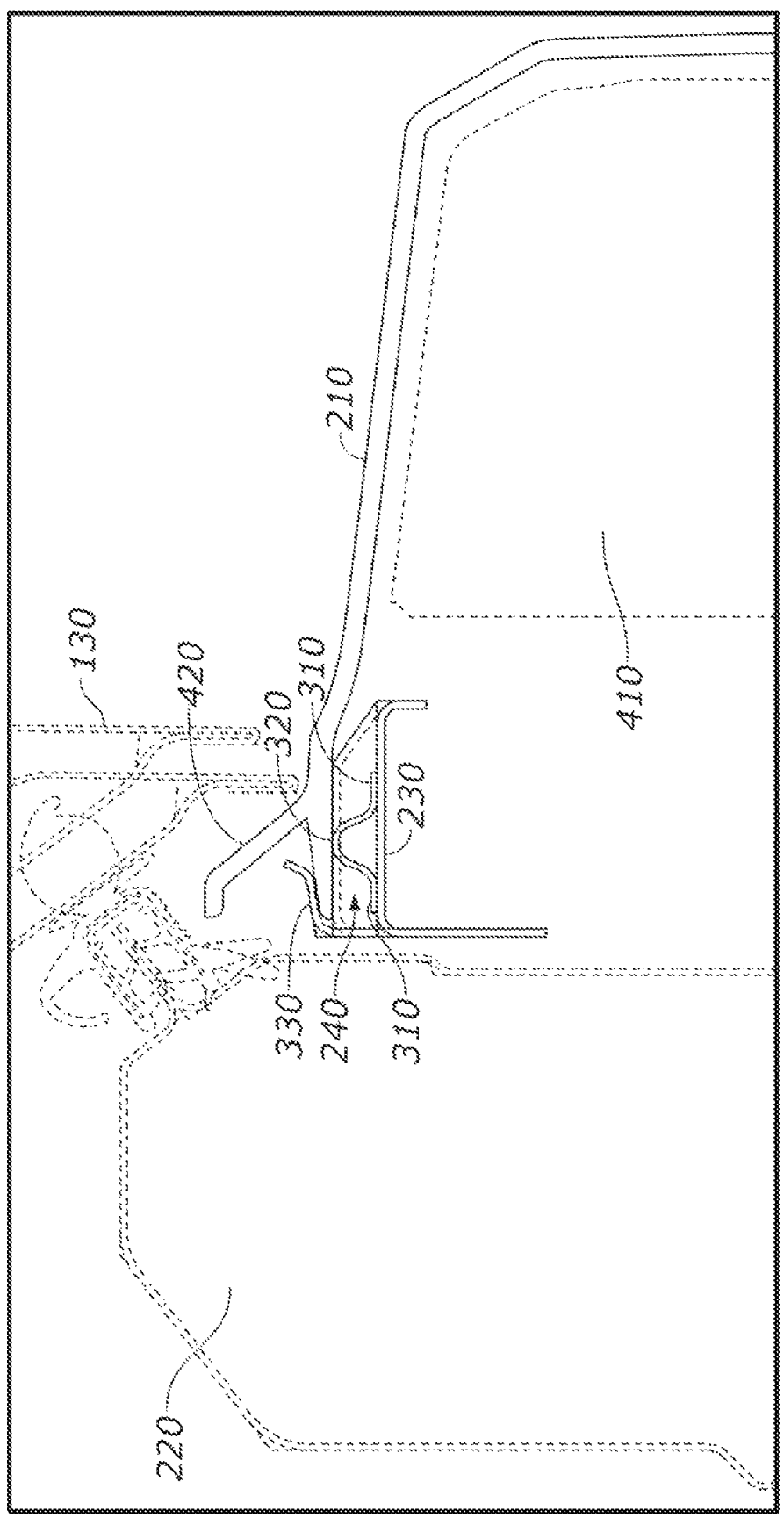
FIG. 4 represents a cross sectional view of the vehicle bumper assembly in FIG. 2.

Referring now to FIG. 4, a cross sectional view is provided of the vehicle bumper assembly within an interior 220 in accordance with aspects of the present disclosure. The elastic clip 240 may be coupled to the bracket 230 at the clip bracket interface 310 and in contact with the bumper cover 210 at the clip bumper interface 320. As shown, the elastic clip 240 may have a substantially u-shaped, inverted u-shaped, or any suitable shaped cross section to enable the elastic clip 240 to contact both the bracket 230 and bumper cover 210. A rear door 130, indicated in dashed lines, may be in a downward position against the bumper cover 210 when the rear door 130 is in a closed position. In the event of an obstruction by an object or body part against the rear door 130 upon closure, bodily injury may occur as a finger, for example, is pinched or jammed against the rear door 130 and bumper cover 210. The resilient nature of the elastic clip 240 may allow it to deform in the event of a pressure applied downward to the top surface of the bumper cover 210, such as by the closing of the rear door 130. The ends of the protrusion portions 330 are also capable of elastically deforming along with the bumper cover 240 upon the insertion of an obstruction or body part against the rear door 130. The protrusion portions 330 and/or elastic clip 240 can reliably deform without affecting the surrounding bracket. A body part therefore, may be protected from injury due to the deformation of the protrusion portions 330 and/or elastic clip 240 which prevent the body part from being pinched between a rear door and bumper cover.

In one implementation, the bumper cover 210 may include a flange 420 which extends outwardly from the inner surface of the bumper cover 210. The flange 420 may be adapted with a groove into which a protrusion portion 330 of a bracket 230 may be engaged and/or fixedly secured. Engagement of a protrusion portion 330 with the bumper cover 210, particularly with the flange 420, may involve latching the protrusion portion 330 onto the bumper cover 210 and/or flange 420 or a similar means of contact. The protrusion portions 330 are generally rigid, but will bend or flex in any direction (e.g., vehicle width, vehicle height) or to any suitable height for engaging with a flange 210 or end portion of the bumper cover 210.

In an alternative implementation, an energy absorbing member 410 may be provided along the vehicle width direction to be in contact with the bumper cover 210. The energy absorbing member 410 may be formed of a resilient olefin type synthetic material such as foam polypropylene or the like, in any suitable form (e.g., beads) to absorb any load or pressure applied to the bumper cover 210. To conform to the internal surface shape of a bumper cover 210 to which it is to be fitted, the energy absorbing member 410 may assume a convex curved shape or any suitable shape corresponding to the internal surface of the bumper cover 210.

In the case of a conventional vehicle lacking the vehicle bumper assembly herein described, an individual may experience the pinching of his hand or finger between a rear door and bumper cover upon the closing of the rear door. The assembly of the present disclosure may prevent bodily injury by providing, within a bumper cover, a bracket coupled to an elastic clip which reliably deforms, thus preventing the pinching of a hand or finger between the rear door and bumper cover.

Particular embodiments and/or implementations of the present disclosure have been described in detail. However, the present disclosure is not limited to these embodiments and/or implementations, and it is understood by one skilled in the art that various other embodiments and/or implementations are possible within the scope of the present disclosure. For example, the protrusion portions may be formed having a y-shaped or other shaped cross section so as to engage with one end of the bumper cover.

Thus, modifications and variations may be made without departing from the spirit and scope of the claimed subject matter in the present disclosure. Such changes in form and detail, including use of equivalent functional and/or structural substitutes for elements described herein, fall within the scope of the appended claims and are intended to be covered by this disclosure.

What is claimed is:

1. A vehicle bumper assembly comprising:
   a bracket for mounting to an interior of a vehicle, the bracket defining a protrusion portion to engage with one end of a bumper cover; and an elastic clip coupled to the bracket, wherein the elastic clip is adapted to contact the bumper cover of the vehicle, and wherein the elastic clip is further adapted to deform from pressure applied to the bumper cover upon insertion of an obstruction against a rear door of the vehicle.

2. The assembly of claim 1, wherein the elastic clip is formed from a material selected from the group consisting of a metal, a plastic and a combination thereof.

3. The assembly of claim 1, wherein the obstruction is a body part.

4. The assembly of claim 1, wherein the elastic clip has a substantially u-shaped or an inverted u-shaped cross section.

5. The assembly of claim 1, wherein the protrusion portion is capable of extending in any direction to engage with the one end of the bumper cover.

6. The assembly of claim 1, wherein the elastic clip is coupled to the bracket by means of an adhesive, a fastener, a bolt or a combination thereof.

7. A vehicle comprising:
a rear door;
an interior disposed within a body, the body forming a bumper;
a bumper cover in contact with the bumper;
a bracket coupled to the interior, the bracket defining a protrusion portion to engage with one end of the bumper cover; and
an elastic clip coupled to the bracket, wherein the clip is adapted to contact the bumper cover, and wherein the elastic clip is further adapted to deform from pressure applied to the bumper cover upon insertion of an obstruction against the rear door of the vehicle.

8. The vehicle of claim 7, wherein the elastic clip is formed from a material selected from the group consisting of a metal, a plastic and a combination thereof.

9. The vehicle of claim 7, wherein the obstruction is a body part.

10. The vehicle of claim 7, wherein the elastic clip has a substantially u-shaped or an inverted u-shaped cross section.

11. The vehicle of claim 7, wherein the protrusion portion is capable of extending in any direction to engage with the one end of the bumper cover.

12. The vehicle of claim 7, wherein the elastic clip is coupled to the bracket by means of an adhesive, a fastener, a bolt or a combination thereof.

13. The vehicle of claim 7 further comprising an energy absorbing member disposed within the interior, wherein the energy absorbing member is adapted to contact the bumper cover in the case of pressure applied to the bumper cover.

14. The vehicle of claim 13, wherein the energy absorbing member is formed from polypropylene.

15. A finger protection assembly for a vehicle, the assembly comprising:
a bracket for mounting to an interior of a vehicle, the bracket defining a protrusion portion to engage with one end of a bumper cover; and
an elastic clip coupled to the bracket, the clip adapted to contact the bumper cover of the vehicle, wherein the elastic clip is capable of deforming to prevent injury to the finger inserted between a rear door and the bumper cover.

16. The assembly of claim 15, wherein the elastic clip is formed from a material selected from the group consisting of a metal, a plastic and a combination thereof.

17. The assembly of claim 15, wherein the elastic clip has a substantially u-shaped or an inverted u-shaped cross section.

18. The assembly of claim 15, wherein the protrusion portion is capable of extending in any direction to engage with the one end of the bumper cover.

19. The assembly of claim 15, wherein the elastic clip is coupled to the bracket by means of an adhesive, a fastener, a bolt or a combination thereof.

* * * * *